United States Patent [19]

Brooks

[11] Patent Number: 4,705,832
[45] Date of Patent: Nov. 10, 1987

[54] INJECTION MOLDABLE AMIDE-IMIDE COPOLYMERS CONTAINING POLYETHERIMIDES

[75] Inventor: Gary T. Brooks, Naperville, Ill.

[73] Assignee: Standard Oil Company (Indiana), Chicago, Ill.

[21] Appl. No.: 881,931

[22] Filed: Jul. 3, 1986

Related U.S. Application Data

[63] Continuation of Ser. No. 727,274, Apr. 25, 1985, abandoned, which is a continuation-in-part of Ser. No. 576,136, Jan. 31, 1984, abandoned.

[51] Int. Cl.$^4$ ............................................. C08L 77/06
[52] U.S. Cl. .................................................... 525/436
[58] Field of Search .......................................... 525/436

[56] References Cited

U.S. PATENT DOCUMENTS 4,258,155  3/1981  Holub et al. .................... 525/436

Primary Examiner—Lewis T. Jacobs
Assistant Examiner—A. Carrillo
Attorney, Agent, or Firm—Robert G. Ladd; William H. Magidson; Ralph C. Medhurst

[57] ABSTRACT

The toughness properties of a polyamide-imide copolymer are improved by the addition of polyetherimides. These copolymers are useful as engineering resins, films are molded objects.

4 Claims, No Drawings

INJECTION MOLDABLE AMIDE-IMIDE COPOLYMERS CONTAINING POLYETHERIMIDES

This is a continuation of application Ser. No. 727,274, filed Apr. 25, 1985, now abandoned, which is a continuation-in-part of Ser. No. 576,136 filed Jan. 31, 1984 now abandoned.

BACKGROUND OF THE INVENTION

This invention relates to polyamide-imide copolymers containing polyetherimides and to molding powders, molded articles and films prepared therefrom. Amide-imide copolymers are a relatively new class of organic compounds known for their solubility in nitrogen containing solvents when in the largely polyamide form. The major application of these amide-imide homopolymers has been as wire enamels. This is illustrated in U.S. Pat. Nos. 3,661,832 (1972), 3,494,890 (1970), and 3,347,828 (1967). Amide-imide homopolymers are not useful in molding applications since parts made from the form fissures, and in general their molecular weight is too low. Amide-imide copolymers have also been found useful for molding applications as shown in U.S. Pat. Nos. 4,016,140 (1977), U.S. Pat. No. 4,136,085 (1979), U.S. Pat. No. 4,313,868 (1982), and U.S. Pat. No. 4,309,528 (1982) which are incorporated herein by reference. These polyamide-imide copolymers are known for their outstanding strength, stiffness and heat resistance properties, but they are brittle materials. The art has been looking for improvements in the impact resistance and toughness of the polyamide-imide copolymer.

A method for improving toughness and impact resistance in thermoplastic polymers is the addition of an impact modifier or toughening agent to the polymer. An example of this is the use of polybutadiene with polystyrene in preparing high impact polystyrene. With polyamide-imide copolymers, however, it is necessary to subject the molded article to a heat curing cycle in order to complete the solid state polymerization and achieve the excellent mechanical properties. Consequently, it is essential that an additive or impact modifier does not impair the curing characteristics of the polyamide-imide copolymer and reduce its cured mechanical properties, particularly the flexural and heat deflection properties. The ideal toughening agent for these copolymers would be one which increases the toughness of the polymer but which does not reduce the polymer's strength, stiffness or heat deflection temperature.

SUMMARY OF THE INVENTION

The general object of this invention is to provide polyamide-imide copolymers having improved toughness as measured by the Dart Impact Test. A more specific object of this invention is to provide polyamide-imide copolymers suitable for use as engineering plastics particularly for use in injection molding and film extrusion wherein the polyamide-imide copolymer toughness as measured by the Dart Impact test and melt ductility properties are improved by the addition of about 10 to about 45 percent by weight of polyetherimides. Other objects appear hereinafter.

I have found that these objects can be accomplished by a resinous blend which comprises about 10 to about 45 weight percent of a polyetherimide and an injection moldable copolymer comprising units of:

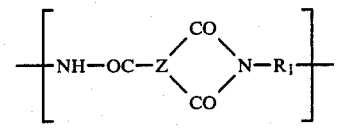

and units of:

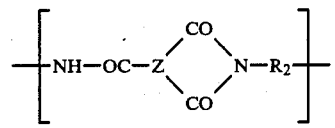

wherein one carbonyl group is meta to, and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein the ratio of said $R_1$ and $R_2$ containing units ranges from about 10 mole percent $R_1$ containing unit and about 90 mole percent $R_2$ containing unit to about 90 mole percent $R_1$ containing unit and about 10 mole percent $R_2$ containing unit.

These objects are also accomplished by a resinous blend comprising about 10 to about 45 weight percent of a polyetherimide and an injection moldable copolymer comprising A units:

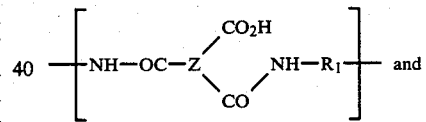 and

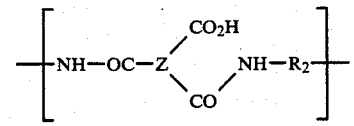

wherein the free carboxyl groups are ortho to one amide group and comprising B units of:

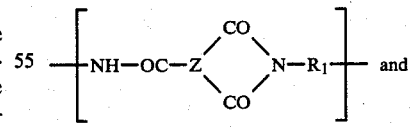 and

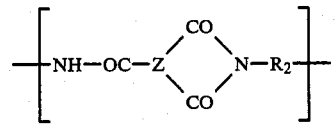

wherein one carbonyl group is meta to, and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO₂—, and S radicals and wherein the molar ratio of A and B units ranges from about 1 mole percent A units and about 99 mole percent B units to about 99 mole percent A units and about 1 mole percent B units and wherein the ratio of $R_1$ and $R_2$ containing components of the A and B units ranges from about 10 mole percent $R_1$ containing components and about 90 mole percent $R_2$ containing components to about 90 mole percent $R_1$ containing components and about 10 mole percent $R_2$ containing components.

The objects can be further accomplished by a process which comprises blending about 10 to about 45 weight percent of a polyetherimide with an amide-imide copolymer.

DETAILED DESCRIPTION OF THE INVENTION

It has been unexpectedly discovered that blends of polyamide-imide copolymers and polyetherimides disclosed herein can be made in which the Dart Impact properties of the blend show a marked improvement over the Dart Impact properties of the components of these blends. By making the above-described blends, the utility of the components of the blend can be considerably expanded. In addition, by blending the polyamide-imide with polyetherimides, products can be obtained which are lower in cost than the polyamide-imides alone, without significant sacrifice of the thermal properties of the polyamide-imides.

I have found that blends of polyamide-imide copolymers, obtained by reacting a polycarboxylic acid anhydride with a mixture of primary diamines, and about 10 to about 45 percent of polyetherimides have improved toughness properties and can readily be injection molded or film extruded into high performance articles which have excellent properties when cured at temperatures up to 500° F.

The amide-imide copolymers of this invention are prepared by reacting an acyl halide derivative of an aromatic tricarboxylic-acid-anhydride with two or more or a mixture of largely- or wholly-aromatic primary diamines. The resulting products are polyamides and polyamic acids wherein the linking groups are predominantly amide groups, although some may be imide groups, and wherein the structure contains free carboxylic acid groups which are capable of further reaction. These polyamide-imide copolymers can be made in accordance with the disclosures and teachings in U.S. Pat. No. 4,136,085 (1979) which is incorporated herein by reference. Such polyamides are moderate molecular weight (7–13,000 as prepared) polymeric compounds having, in their molecule, units of:

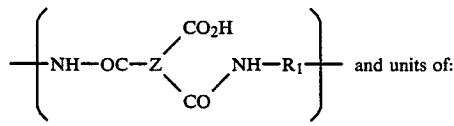 and units of:

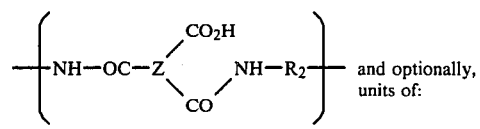 and optionally, units of:

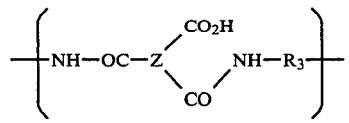

wherein the free carboxyl groups are ortho to one amide group, Z is an aromatic moiety containing 1 to 4 benzene rings or lower-alkyl-substituted benzene rings; $R_1$, $R_2$ and $R_3$ are different and are divalent, wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages, such as —O—, methylene, —CO—, —SO₂—, —S—; for example —R'—O—R'—, —R'—CH₂—R'—, —R'—CO—R'—, —R'—SO₂—R'— and —R'—S—R'—. The terms polyamide-imide, polyamide-imide copolymer, and amide-imide copolymer are used interchangeably herein to refer to these copolymers.

These polyamic acids are capable of substantially complete imidization by heating, by which they form the polyamide-imide structure having, to a substantial extent, reoccurring units of:

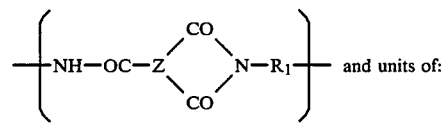 and units of:

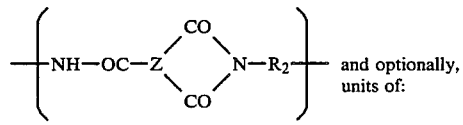 and optionally, units of:

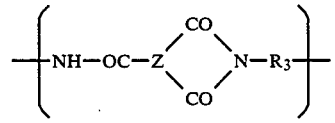

wherein one carbonyl group is meta to and one carbonyl group is para to each amide group and wherein Z, $R_1$, $R_2$ and $R_3$ are defined as above. Typical copolymers useful in this invention have up to about 50 percent imidization prior to heat treatment, typically about 10 to about 40 percent.

A mixture of diamines which contains two or more, preferably two or three, wholly- or largely-aromatic primary diamines can be used. More particularly, the diamines are wholly- or largely-aromatic primary diamines composed of two divalent aromatic moieties of from 6 to about 10 carbon atoms, each moiety containing one primary amine group, and the moieties linked directly or through, for example, a bridging —O—, —S—, —SO₂—, —CO—, or methylene group. When three diamines are used they are preferably selected from the class composed of:

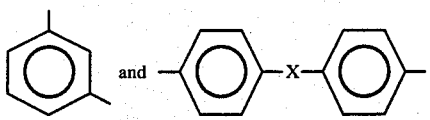

said X being —O—, —CH$_2$—, or —SO$_2$—group. Preferably, the mixture of aromatic primary diamines is composed of at least two diamines selected from the group consisting of meta-phenylenediamine, p,p'-oxybis-(aniline), p,p'-sulfonylbis-(aniline) and p,p'-methylenebis(aniline). Preferably, the mixture of primary aromatic diamines contains meta-phenylenediamine and p,p'-oxybis-(aniline). The aromatic nature of the diamines provides the excellent thermal properties of the homopolymer copolymers while the primary amine groups permit the desired imide rings and amide linkages to be formed.

Usually the copolymerization is carried out in the presence of a nitrogen-containing organic polar solvent, such as N-methyl-pyrrolidone, N,N-dimethylformamide and N,N-dimethylacetamide. The reaction should be carried out under substantially anhydrous conditions and at a temperature below about 150° C. Most advantageously, the reaction is carried out from about 20° to about 50° C.

The reaction time is not critical and depends primarily on the reaction temperature. It may vary from about 1 to about 24 hours, with about 2 to 4 hours at about 30° C. to 50° C. preferred for the nitrogen-containing solvents.

Cavity pressure measurements are used as quality control checks of polyamide-imide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

It has been found that resins that have low cavity pressure process poorly. Low cavity pressures indicate a large pressure drop between injection and cavity pressures. This indicates higher resin viscosities. In the same manner high cavity pressures indicate less pressure change between injection and cavity pressures, suggesting lower resin viscosities.

Amide-imide copolymer viscosities had been measured by spiral flow determinations previous to the implementation of the cavity pressure procedure, see U.S. Pat. No. 4,224,214 (1980). Cavity pressure was selected over spiral flow because of its greater sensitivity. The cavity pressure test has been implemented as an amide-imide copolymer quality control procedure. Like spiral flow, cavity pressure is a test that can be done conveniently in a molder's shop.

The polyetherimides which are employed in the present invention can be made in accordance with the disclosures and teachings in U.S. Pat. No. 3,847,867 issued Nov. 12, 1974 which is incorporated herein by reference. Suitable polyetherimides comprise essentially chemically combined units of the formula:

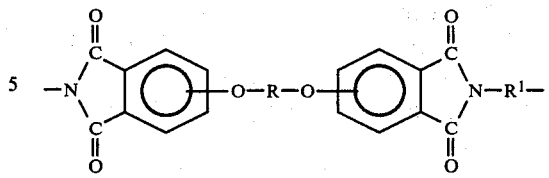

wherein R is a member selected from the class consisting of (a) the following divalent organic radicals:

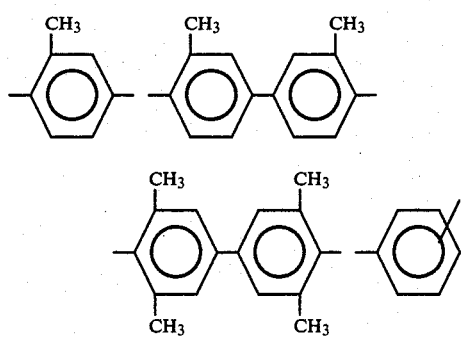

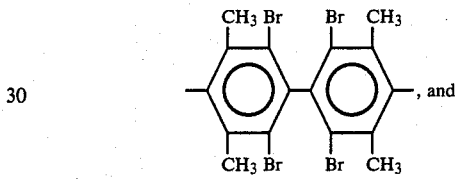

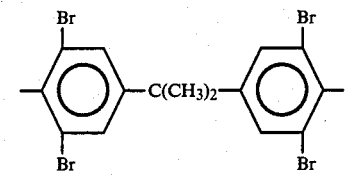

and (b) divalent organic radicals of the general formula:

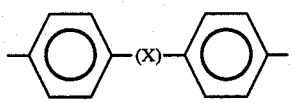

where X is —C$_y$H$_{2y1}$—, y is a whole number equal to 1 to 5 inclusive, and R is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) C$_{(2-8)}$ alkylene terminated polydiorganosiloxanes, and (d) divalent radicals included by the formula:

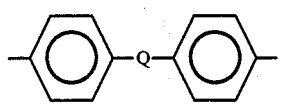

where Q is a member selected from the class consisting of:

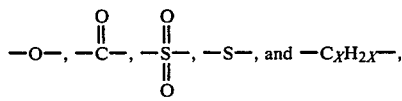

and X is a whole number equal to 1 to 5, inclusive.

A preferred class of polyetherimides which are included by formula (I) are polymers comprising of from about 2 to 5000 or more units and preferably from about 5 to about 100 units of the formula:

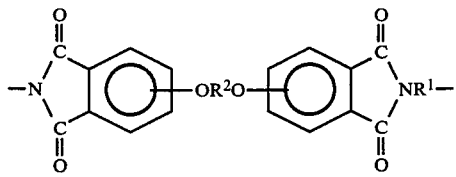
(II)

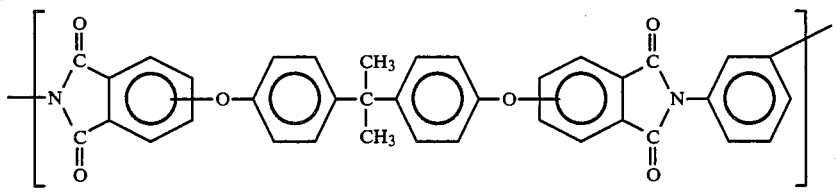

where $R^1$ is previously defined, and $R^2$ is:

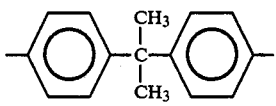

Included by the polyetherimides of formula II are polymers comprising the following chemically combined units:

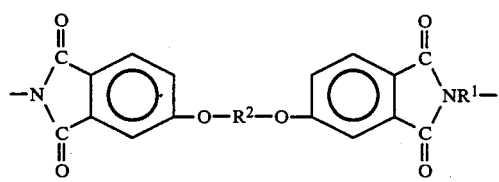
(III)

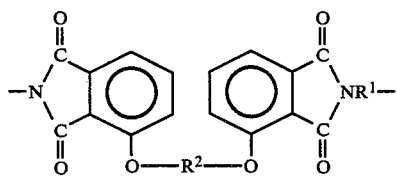
(IV)

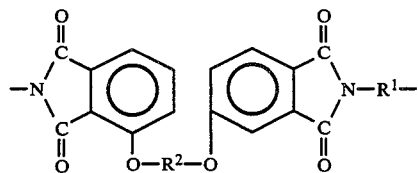
(V)

and mixtures thereof, where $R^1$ and $R^2$ are defined above.

The polyetherimides of formulas II–V can be made by effecting reaction between an aromatic bis(etheranhydride) of the general formula:

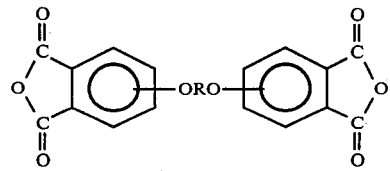
(VI)

and an organic diamine of the general formula:

$H_2NR^1NH_2$      (VII)

where R and $R^1$ are as previously defined.

The preferred polyetherimide used in the instant resinous blend has the following repeating units:

In making the polyetherimides, there are employed from 0.95 to 1.05 mols of the aromatic dianhydride of formula VI per mol of the organic diamine of formula VII. Preferably, one can employ equal or lower amounts of the bisanhydride and diamine.

The aromatic bis(etheranhydride) of formula VI shown in the above-mentioned U.S. Pat. No. 3,847,867 (1974), can be prepared from the hydrolysis followed by dehydration of the reaction product of the nitrosubstituted phenyl dinitrile and then continuing the reaction with a dialkali metal salt of a dihydric aryl compound in the presence of a dipolar aprotic solvent, where the alkali metal salt has the general formula:

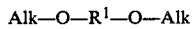

wherein $R^1$ has the meanings given above and preferably is the same as $R^2$ and Alk is an alkali metal ion. Various well-known procedures can be used to convert the resulting tetranitriles to the corresponding tetracids and dianhydrides.

The amount of the polyetherimide added to the amide-imide copolymer can range from about 0.1 to about 50 weight percent based on the amide-imide copolymer, preferably 10 to 45 weight percent, and most preferably about 10 to about 30 percent. The polyetherimide is not completely miscible in the amide-imide copolymers, as determined by the blend glass transition temperatures ($T_g$). When polyetherimide loadings exceed 10 percent by polymer weight, separate polyamide-imide rich and polyetherimide rich phases are detected as evidenced by separate $T_g$s. The polyamide-imide $T_g$ is slightly supressed at the higher blend levels even though a second, lower polyetherimide $T_g$ is present. At polyetherimide loadings below approximately 10 percent, a single blend $T_g$ is observed. This single $T_g$ may be due to the sensitivity limits of the differential Scanning Calorimeter. For consistency purposes, the polyamide-imide/polyetherimide blends are herein considered immiscible since they are not miscible over a wide blending range. When 20 weight percent of a polyetherimide was dry blended with the amide-imide copolymer and the blend was molded, two $T_g$s were detected. The $T_g$ of the amide-imide polymer used as a control was 266° C. as molded while the polymer containing 20 percent by weight of polyetherimide had a glass transition temperature of about 256° C. and a second glass transition temperature of about 220° C. After being cured at a temperature of 160° C. to 260° C., the glass transition temperature for the control polyamide-imide copolymer increased to 279° C. while the $T_g$s of the blend containing 20 percent polyetherimide increased to about 272° C. for the first $T_g$ and 220° C. for the second $T_g$. This increase in $T_g$ during cure is critical since it indicates that imidization and solid state polymerization has occurred. It is during this post cure step that the amide-imide chains grow and build their excellent mechanical and thermal properties.

To build mechanical properties, parts are annealed at temperatures up to about 530° F. but preferably about 500° F. Since the polyetherimides are immiscible in the polyamide-imide copolymers over a wide blending range, the polyamide-imide copolymer $T_g$ remains above the maximum cure temperature allowing excellent curing even though the blend contains high loadings of polyetherimide. It is important that the polyamide-imide $T_g$ is above the maximum annealing temperatures so that molded part distortion due to stress relaxation does not occur.

The addition of polyetherimide to the polyamide-imide copolymer can also have significant effects on the flow properties of the polyamide-imide; however, the flow improvements are dependent on the starting melt viscosity of the polyamide-imide and the shear forces the alloy (blend) encounters during fabrication. The greater the melt viscosity of the polyamide-imide, the greater the flow improvements are via alloying with polyetherimide. With high flow, low molecular weight polyamide-imides, the addition of a polyetherimide has little, if any, effect on reducing the melt viscosity at injection molding shear rates of the polyamide-imide and in some cases the polyamide-imide flow may be reduced if alloyed with polyetherimide. The addition of polyetherimide significantly reduces the melt viscosity and improves the melt ductility of the polyamide-imide at low shear rates thus allowing a thin film to be extruded.

The difference in flow at high and low shear rates can be explained by comparing the shear rate vs. viscosity curves of the polyamide-imide with that of the polyetherimide. The polyamide-imide copolymer behaves as a power law fluid over a wide shear rate range, thus, its viscosity response is similar at high and low shear rates. The neat polyetherimide viscosity approaches a Newtonian fluid at low shear rates and its viscosity is an order of magnitude less than the polyamide-imide. At high shear rates, the polyamide-imide and polyetherimide viscosities converge. Thus the addition of polyetherimide has little effect on the flow properties of the polyamide-imide at high shear rates (injection molding) but it has a significant effect on the polyamide-imide flow at lower shear rates (extrusion, compression molding, etc.).

The effectiveness of the polyetherimide as a flow aid for the polyamide-imide is dependent on the shear forces encountered during fabrication and the rheological characteristics of the polyamide-imide and polyetherimide, mainly their power law indices (flow behavior index), their constancy indices and their activation energy. Since polyamide-imides are reactive polymers their viscosity characteristics can change during fabrication. Thus, the effectiveness of the polyetherimide as a flow aid can also change whereby the alloy can have improved flow with residence time in the barrel during the molding process. This is an unobvious and unique feature of my novel composition since polyamide-imide flow properties usually decrease with residence time.

Polyamide-imide/polyetherimide blends can be prepared by physically blending the constituents together, either pellet to pellet, powder to powder, powder to pellet, or pellet to powder with or without a compounding step prior to injection molding or film extruding. It is preferred that the constituents are melt compounded; especially using a twin screw extruder.

It has been found that the mechanical properties of the amide-imide copolymers are improved by the addition of about 20 to 60 percent by weight glass fibers, glass beads, industrial materials such as talc, or graphite or mixtures thereof. In the preferred range the polyimides contain 30 to 40 percent by weight of the glass fibers, glass beads, talc or graphite or mixtures thereof. The glass fibers are preferably made of alkali-free, boron-silicate glass or alkali-containing C-glass. The thickness of the fiber is suitably on the average between 0.003 mm and 0.03 mm. It is possible to use both long fibers with average lengths of from 1.5 to 15 mm and also short fibers of an average filament length from 0.05 to 5 mm. In principle, any standard commercial-grade fibers, especially glass fibers, may be used. Glass beads ranging from 0.005 mm to 0.8 mm in diameter may also be used as a reinforcing material.

The filled polyamide-imide/polyetherimide blends can be prepared as described above or the polyetherimide can be dissolved in a solvent and spray coated or dip coated on the filler and/or reinforcement (graphite fibers, glass fibers, and mineral fillers).

The reinforced polyamide-imide copolymers may be prepared in various ways. For example, so-called roving endless glass fiber strands can be coated with the polyetherimide disclosed herein and then further coated with the polyamic acid melt and subsequently chopped. The chopped fibers or the glass beads coated with polyetherimide can also be mixed with granulated polyamic acid and the resulting mixture melted in a conventional extruder, or alternatively the fibers coated with polyetherimide can be directly introduced into the polyamic acid melt through a suitable inlet in the extruder. Injection molding of the unfilled or glass-filled copolyamide-imides is accomplished by injecting the copolyamideimides into a mold maintained at a temperature of about 350° F. to 450° F. In this process a 15 to 30 second cycle is used with a barrel temperature of about 580° F. to 640° F. The injection molding conditions are given in Table 1.

TABLE 1

|  | Set Points |
|---|---|
| Cylinder Temperature (°F.) | |
| Nozzle | 630–660 |
| Front Zone | 630–660 |
| Rear Zone | 620–650 |
| Timer (seconds) | |
| Clamp Closed (cure) | 18 |
| Injection Hold | 6 |
| Booster (Inj. Hi) | 2 |
| Cycle Delay (open) | 1 |

TABLE 1-continued

|  | Set Points |
|---|---|
| High-Low | 2 |
| Injection Pressure (psi) | |
| High | 20,000 |
| Low | 10,000 |
| Machine Settings | |
| Clamp Pressure (tons) | Max. |
| Injection Rate | Max. |
| Screw RPM | 50 |
| Feeding Setting | As Req'd. |
| Cushion | ¼" |
| Back Pressure (psi) | 220 |
| Mold Temperature (°F.) | |
| Stationary | 450 |
| Movable | 450 |
| Hopper Drier | 220 |

The mechanical properties of the unfilled amide-imide copolymers containing about 10 to 45 weight percent polyetherimides (melt compounded) are given in Table 2. These results show that these copolymers have excellent mechanical and thermal properties. The polyamide-imide copolymer toughness as measured by Dart Impact is significantly improved by the addition of about 10 to about 45 percent by weight of polyetherimide as shown in Table 2. The polyamide-imide/polyetherimide blends were molded at 660° F.

and it can be dropped from a height of 6 feet. The purpose of a light weight dart is to increase the test sensitivity which is necessary when studying polymers which tend to become brittle. A clear plastic (Plexiglass) 4 inch inside diameter tube is used to guide the Dart and an electro-magnetic holder is used to raise the Dart. By turning the electrical power off to the electro magnetic holder, the Dart is dropped onto the plaque from various heights.

All of the materials studied were molded on the 10 oz. Stokes injection molder under Table I molding conditions unless specified otherwise. A 10 oz. Stokes injection molder is fitted with a 1:1 compression thermoset screw which can hold approximately 365 grams of amide-imide copolymer (approximately 0.8 lbs.). Since each test tree weighs approximately 23 grams (neat parts) only 1/16th of the complete injection stroke (shot volume) is used during the molding evaluation. Under these conditions (18 second clamp), the total time the polymer is trapped in the barrel is approximately 7.2 minutes (total cycle is 27 seconds). This does not mean that the polymer is in the melt state for the complete 7.2 minutes due to the temperature gradient (front to rear) in the barrel. For a complete material transition (purge) 16–20 shots must be taken before collecting data.

Amide-imide copolymer flow, under molding conditions is determined by its cavity pressure which is mea-

TABLE 2

| | | | | | | | | | | | | | | |
|---|---|---|---|---|---|---|---|---|---|---|---|---|---|---|
| Polyamide-imide, % | 96.5 | 86.9 | 77.2 | 67.6 | 57.9 | 0 | 69 | 64.8 | 60 | 55.2 | 65.5* | 0 | 69 | 55.2 |
| Polyetherimide, % | — | 9.6 | 19.3 | 28.9 | 38.6 | 100 | — | 7.2 | 15 | 13.8 | 3.5 | 70 | — | 13.8 |
| $TiO_2$, % | 3.0 | 3.0 | 3.0 | 3.0 | 3.0 | — | — | — | — | — | — | — | — | — |
| PTFE, % | 0.5 | 0.5 | 0.5 | 0.5 | 0.5 | — | 1.0 | 1.0 | 1.0 | 1.0 | 1.0 | — | 1.0 | 1.0 |
| Glass Fiber PPG-3540, % | — | — | — | — | — | — | 30 | 27 | 24 | 30 | 30 | 30 | — | — |
| Graphite Fibers AS1810, % | — | — | — | — | — | — | — | — | — | — | — | — | 30 | 30 |
| Physical Properties | | | | | | | | | | | | | | |
| Tensile Strength $\times 10^3$, PSI | | | | | | | | | | | | | | |
| As-Molded | 10.9 | 12.9 | 12.2 | 11.5 | 11.1 | 15.2 | 20.6 | 20.2 | 20.4 | 20.7 | 17.4 | 24.5 | 17.1 | 20.3 |
| Cured @ 500° F. Yield | None | None | 21.6 | 19.5 | 19.8 | NR | None | — | — | — | — | None | None | None |
| Cured @ 500° F. Break | 26.9 | 22.2 | 20.9 | 18.7 | 19.2 | NR | 30.0 | 29.9 | 27.0 | 26.4 | 28.2 | NR | 33.2 | 33.5 |
| Tensile Elongation, % | | | | | | | | | | | | | | |
| As-Molded | 3.3 | 4.4 | 4.1 | NR | 3.9 | 60 | 4.8 | 5.0 | 5.0 | 5.6 | 4.0 | 3.0 | 5.0 | 5.4 |
| Cured @ 500° F. Yield | None | None | 13.8 | 12.6 | 10.9 | NR | None | — | — | — | — | None | None | None |
| Cured @ 500° F. Break | 17.3 | 24.5 | 25.7 | 22.3 | 18.1 | NR | 7.9 | 8.5 | 7.8 | NR | 6.4 | NR | 8.1 | 8.0 |
| Flexural Modulus $\times 10^6$, PSI | | | | | | | | | | | | | | |
| As-Molded | 0.78 | 0.68 | 0.68 | 0.64 | 0.63 | 0.48 | 1.60 | 1.46 | 1.33 | 1.53 | 1.52 | 1.20 | 2.05 | 2.28 |
| Cured @ 500° F. | 0.72 | 0.66 | 0.62 | 0.63 | NR | NR | 1.55 | 1.41 | 1.24 | 1.41 | 1.52 | NR | 2.30 | 2.57 |
| Flexural Strength $\times 10^3$, PSI | | | | | | | | | | | | | | |
| As-Molded | 20.0 | 17.9 | 18.0 | 16.0 | 13.2 | 27.4 | 30.9 | 29.7 | 26.0 | 29.3 | NR | 33.3 | 29.8 | 35.6 |
| Cured @ 500° F. | 35.4 | 30.9 | 30.2 | 28.4 | NR | NR | 42.3 | 41.6 | 39.7 | 42.5 | NR | NR | 54.6 | 52.3 |
| Izod Impact, Notched, ft-lbs/in | | | | | | | | | | | | | | |
| As-Molded | 0.5 | 0.8 | 0.8 | 0.7 | NR | 1.0 | 1.0 | 1.1 | 0.9 | 1.1 | 1.35 | 2.0 | 0.9 | 1.0 |
| Cured @ 500° F. | 2.6 | 2.6 | 2.5 | 2.8 | NR | NR | 1.5 | 1.6 | 1.8 | 1.8 | 2.1 | NR | 1.4 | 1.4 |
| Dart Impact, in-lbs | | | | | | | | | | | | | | |
| As-Molded | 0.8 | 1.1 | 1.1 | 1.1 | NR | 4.5 | NR | NR | NR | NR | NR | 4.8 | — | — |
| Cured @ 500° F. | 15.5 | 22.3 | 62.0 | 48.3 | NR | NR | 10.5 | 11.1 | NR | 12.8 | NR | NR | — | — |
| HDT, °F. | | | | | | | | | | | | | | |
| As-Molded | 457 | 452 | 439 | 429 | 418 | 392 | 484 | 485 | 463 | 480 | 460 | 410 | 490 | 478 |
| Cured | 530 | 522 | 515 | 506 | NR | NR | 529 | 524 | 519 | 527 | 524 | NR | 542 | 525 |
| Flexural Strength $\times 10^3$, PSI | | | | | | | | | | | | | | |
| @ 400° F. | 19.8 | 18.4 | 17.5 | 14.9 | NR | 5.6 | 29.3 | 29.8 | 28.3 | NR | 25.3 | 12.5 | NR | NR |
| @ 450° F. | 16.2 | 15.3 | 13.0 | 8.9 | NR | 0 | 24.3 | 25.1 | 23.7 | NR | NR | NR | NR | NR |

NOTE:
Polyamide-imide and its blends were cured 1 day @ 400° F., 450° F., 465° F., 480° F. and 3 days @ 500° F. Polyetherimide was not cured since its cured and as-molded properties are similar. Polyetherimide cannot withstand a 500° F. cure without distorting.
NR = Not Run
*Sample was a physical blend, the remaining blends were melt blended on a ZSK-30 Werner Pfleider twin screw extruder.

To adequately differentiate the molded part toughness of the copolymers, its alloys, and other high performance polymers, a Dart Impact Test procedure has been developed. The test fixture is designed to fully restrain the elliptical 60 mil plaque while the dart radius and dart weight are 0.5 inches and 1.33 pounds, respectively. The dart weight can be increased to 7.2 pounds, sured at a point farthest from the sprue. In this test, a pressure transducer is fitted behind a knockout point located behind the flex bar. The higher the cavity pressure, the better the flow thus making for easier mold filling. To determine our amide-imide copolymer reactivity a plot of cavity pressure vs. cycle time is drawn. A stable or non-reactive resin will exhibit good flow characteristics under adverse molding conditions. A reactive polymer will be cycle time dependent in that its viscosity increases with cycle time. This is illustrated by a steep negative cavity pressure slope. Amide-imide copolymer samples were dried for approximately 16 hours at 300° F. in a hot circulating oven containing a suitable desiccant. The polyetherimide was dried overnight in a vacuum oven at 230° F. Samples were dry blended together and stored under vacuum in sealed containers.

The injection molding machine was equipped with a horizontally mounted thermoset screw and barrel assembly. The mold was heated with hot oil from a Mokon Model 105-057 heating unit. Cavity pressure was recorded with a Control Process Model 241 recorder. The mold was equipped to handle pressure transducers at the ejector pins located at the gate end of the tensile bar and the gate end of the flex bar before we began our work. Since it was desirable to make cavity pressure measurements at the dead end of the flex bar, it was necessary to make some modifications in the mold base to accommodate a transducer at this pin position.

The flow rate procedure was patterned after the standard method described in ASTM D1238. A 335° C. (635° F.) barrel temperature with a 30 minute preheat time was used. This is about the largest set of weights that can be used safely with the standard extrusion plastometer apparatus. A standard 0.0825 in. diameter, and a 0.315 in. long orifice was used.

Special care was taken to be sure that each flow rate measurement was started when an equivalent volume of resin was in the barrel. Previous rheology work indicated that there is a very large "barrel height" effect on amide-imide copolymers. Each flow rate measurement was initiated while the top of the piston collar was between the two scribe marks on the piston. This precaution is also required by ASTM in method D1238.

Amide-imide copolymer samples were cured in a Blue M hot air programmable oven under a 7-day cycle with 1 day at 400° F., 450° F., 465° F., 480° F. and 3 days at 500° F. Thin films from 0.5 to 10 mils can be extruded from the polyamide-imide/polyetherimide blends. These films have excellent properties as illustrated in Table 3. Films were prepared in a Werner Pfleider ZSK-30 twin screw extruder and samples were collected at different take-off speeds. The polyamide-imide copolymer/polyetherimide blend exhibited good melt ductivity and flow properties allowing a thin, tough film to be extruded. The films were tensile tested and they exhibited a yield point indicating ductility. The films could be cured at 500° F. without distorting.

TABLE 3

| 80/20 Polyamide-imide Copolymer/Polyetherimide | | |
|---|---|---|
| Film Gauge, mils | 9 | 10 |
| Yield Tensile Strength, PSI | | |
| *MD | 18,420 | 19,330 |
| **TD | 17,160 | 18,640 |
| Break Tensile Strength, PSI | | |
| MD | 18,150 | 18,840 |
| TD | 16,900 | 17,890 |
| Yield Tensile Elongation, % | | |
| MD | 9.1 | 9.5 |
| TD | 8.2 | 9.2 |
| Break Tensile Elongation, % | | |
| MD | 15.0 | 16.0 |

TABLE 3-continued

| 80/20 Polyamide-imide Copolymer/Polyetherimide | | |
|---|---|---|
| TD | 16.6 | 11.5 |
| Tensile Modulus, PSI | | |
| MD | 402,300 | 411,300 |
| TD | 409,600 | 400,400 |

*MD is machine direction
**TD is transverse direction

The amount of the polyetherimide added to the polyamide-imide copolymer can range from about 10 to about 45 weight percent, usually in the range of about 10 to about 30 percent.

The following examples illustrate the preferred embodiment of the invention. It will be understood that the examples are for illustrative purposes only and do not purport to be wholly definitive with respect to conditions or scope of the invention.

EXAMPLE I

A 200 ml, round-bottom, 4-neck flask, equipped with a nitrogen inlet tube, stirrer, thermometer, and solids addition funnel, was charged with 99.9 parts by weight (pbw) of p,p'-oxybis(aniline) (OBA), 23.1 pbw metaphenylene-diamine (MPDA) and 604 pbw N-methylpyrrolidone (NMP). When solution at room temperature (72° F.) was complete, 142.5 pbw 4-trimellitoyl anhydride chloride (4-TMAC), having a percent purity of 99.5 percent±0.5 percent as determined from chloride content and 4.0 pbw of trimellitic acid anhydride (TMA) was added over 2.5 hours while maintaining a solution temperature of between about 77°–95° F. When addition was complete the solution was stirred for 3 hours during which time the solution viscosity increased to a Gardner-Holdt value of Z5+ or about 110 poises.

Solid polymer was obtained by first pouring the viscous solution into twice its volume of distilled water in a Waring blender and then filtering. The filtrate was washed with 5 increments of 3000 pbw each of distilled water to remove hydrogen chloride that had been generated during reaction.

The solid was dried under a vacuum of 20 inches of mercury for 24 hours at 122° F. The above material was heated for 2 hours in an oven set at 450° F. to give the final product.

EXAMPLE II

The general procedure for preparing a copolymer containing three diamines is illustrated by the reaction of OBA, MPDA, MBA and 4-TMAC in DMAC. Thus, a 242.0 gram portion of OBA (1.21 moles), a 130.7 gram portion of MPDA (1.21 moles) and a 239.6 gram portion of MBA (1.21 moles were dissolved in 3,900 grams DMAC contained in a 6-liter flask equipped with a nitrogen purge, stirrer, addition funnel and thermometer. A 765 gram portion of 4-TMAC (3.63 moles) in flake or lump form was then added to the solution in portions over 90 minutes. The reaction exotherm was allowed to raise the temperature to about 35° C. The reaction temperature was maintained at 33°–38° C. for the remainder of the 4-TMAC addition using cooling water when necessary. After the TMAC addition was completed, any residual TMAC clinging to the addition funnel was completely washed into the reaction solution with 70 grams DMAC. A heating mantle was applied to the reaction flask and the temperature quickly raised (about 20 min.) to 50° C. The reaction solution was stirred at 50° C. for 90 minutes and then the solution was precipitated by admixing with water. Prior to precipitation the solution viscosity was about 7.5 stokes (25° C., 20 percent solids). The polymer was precipitated in distilled water in a model D, W. J. Fitzpatrick Company, comminuting machine (Fitz mill). After precipitation the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°-35° C. for 12-15 hours.

EXAMPLE III

Polyamide-imide/polyetherimide powder blends, ranging in concentration from 95/5 to 5/95, were melt homogenized in a Brabender measuring head for 6 minutes at 340° C. and torque measurements were recorded. A sample of the melt blends were also submitted for an inherent viscosity after 6 minutes of mixing. Table 4 reports the results. The alloy inherent viscosity vs. blend concentration follows the law of mixtures where the curve falls in the lower envelope of the additive profile region. The addition of 10 percent, 20 percent and 30 percent by weight of polyetherimide reduces the polyamide-imide mixing torque by 17%, 30% and 59%, respectively. This clearly illustrates the significant effect that polyetherimide has on reducing the melt viscosity of polyamide-imide copolymers when fabricated under low shear condition.

TABLE 4

Polyamide-Imide/Polyetherimide Blends Brabender Mixing Study

| Blend Composition (PAI/PEI) | Melt Temp. °C. | Torque Newton-Meters | I.V. After 6 Min. of Mixing, dl/g |
| --- | --- | --- | --- |
| 100/0 | 367 | 75 | 1.12 |
| 95/5  | 364 | 70 | 0.87 |
| 90/10 | 362 | 62 | 0.80 |
| 80/20 | 362 | 52 | 0.85 |
| 70/30 | 350 | 31 | 0.71 |
| 60/40 | 346 | 29 | 0.68 |
| 50/50 | 341 | 24 | 0.60 |
| 40/60 | 342 | 18 | 0.60 |
| 30/70 | 341 | 17 | 0.55 |
| 20/80 | 339 | 18 | 0.55 |
| 10/90 | 341 | 16 | 0.52 |
| 5/95  | 336 | 17 | 0.47 |
| 0/100 | 340 | 15 | 0.44 |

Mixing Speed 47 RPM
Set Temperatures of Measuring Head 340° C.

EXAMPLE IV

Polyamide-imide copolymer prepared as detailed in Example I was melt blended with 5, 20, and 40 weight percent of a polyetherimide (Ultem 1000) in a Brabender mixing head for six minutes at a set chamber temperature of 340° C. Samples were tested for glass transition temperature ($T_g$) using a conventional DSC apparatus.

Two $T_g$s were detected in the 60/40 and 80/20 polyamide-imide/polyetherimide blends. One $T_g$ (polyamide-imide copolymer) was detected in the 95/5 blend, but the polyetherimide $T_g$ was probably not detected because of its low concentration.

The results are tabulated below along with $T_g$s for polyamide-imide and polyetherimide materials. Overall, the results indicate that a two-phase blend is formed when polyamide-imide copolymers are blended with a polyetherimide.

TABLE 5

| Polyether-imide (PEI), % | Polyamide-imide (PAI), % | $T_g$ °C. PEI | $T_g$ °C. PAI |
| --- | --- | --- | --- |
| 100 | 0   | 214 | —   |
| 40  | 60  | 215 | 273 |
| 20  | 80  | 218 | 268 |
| 5   | 95  | ND  | 273 |
| 0   | 100 | —   | 272 |

ND: Not Detected

EXAMPLE V

Samples representing blends of a polyamide-imide copolymer prepared as detailed in Example I with a polyetherimide (Ultem 1000) have been prepared by melt blending in a Werner & Pfleiderer ZSK-30 twin screw extruder at Ultem 1000 loadings of 10, 20, and 30 weight percent. A single $T_g$ was detected at the 10% composition, but two $T_g$s were detected at the 20% and 30% loadings. The lower $T_g$s were so small that an accurate value could not be assigned, but were estimated to range from 428° F. to 423° F. for the 20% and 30% blends, respectively. The pure polyetherimide (Ultem 1000) $T_g$ was not detected in the 90/10 blend; however, it may be present but below the detection limit of our DSC instrument.

The behavior is depicted in the below table.

TABLE 6

| Polyether-imide (PEI), % | Polyamide-imide (PAI), % | $T_g$ °C. PEI | $T_g$ °C. PAI |
| --- | --- | --- | --- |
| 0  | 100 | —            | 266 (511° F.) |
| 10 | 90  | —            | 258 (496° F.) |
| 20 | 80  | 220 (428° F.) | 256 (495° F.) |
| 30 | 70  | 217 (423° F.) | 248 (478° F.) |

EXAMPLE VI

The addition of 10 and 20 weight percent of polyetherimide improves the polyamide-imide toughness properties as determined by a 30% to 50% increase in ultimate tensile elongation. At polyetherimide loadings of 20%, 30% and 40%, the neat polyamide-imide copolymer blend exhibited a yield point on the stress/strain curve. The yield elongation of these polyamide-imide copolymer/polyetherimide blends are approximately one half that of the ultimate elongation. A yield point on a stress/strain curve is uncharacteristic of a polyamide-imide molded part and a major advantage of these polyamide-imide copolymer/polyetherimide alloys since the lack of toughness has excluded polyamide-imides from many high performance applications. The addition of polyetherimide did not reduce the notch sensitivity of the polyamide-imide even though the polyetherimide has approximately 40 percent of the notched Izod impact resistance of the polyamide-imide copolymer. The remaining strength, stiffness and heat deflection temperatures of the polyamide-imide copolymer/polyetherimide blends follow a predictable law of mixture trend.

| Polyetherimide, % | 0 | 10 | 20 | 30 | 40 |
| --- | --- | --- | --- | --- | --- |
| Tensile Strength × $10^3$, PSI | | | | | |
| Yield | None | None | 21.6 | 19.5 | 19.8 |

-continued

| Polyetherimide, % | 0 | 10 | 20 | 30 | 40 |
|---|---|---|---|---|---|
| Break | 26.9 | 22.2 | 20.9 | 18.7 | 19.2 |
| Tensile Elongation, % | | | | | |
| Yield | None | None | 13.8 | 12.6 | 10.9 |
| Break | 17.3 | 24.5 | 25.7 | 22.3 | 18.1 |
| Notched Izod Impact, ft-lbs/in | 2.6 | 2.6 | 2.5 | 2.8 | Not Run |

Note: Samples have been cured @ 500° F.

EXAMPLE VII

The addition of 10%, 20% or 30% by polymer weight of polyetherimide significantly improves the Falling Dart impact resistance of the polyamide-imide copolymer, as illustrated below. These impact results are ideal since the polyamide-imide copolymer/polyetherimide alloys had impact properties superior to either of its blend components, thus exhibiting a synergestic impact trend. The dart used in the experiment had a radius of 0.5 inches and it weighed 1.33 pounds. An impact failure occurred when a crack was initiated (visually determined) on the 60 mil plaque surface.

| % Polyetherimide | 0 | 10 | 20 | 30 | 100 |
|---|---|---|---|---|---|
| Dart Impact in-lbs | | | | | |
| As Molded | 0.8 | 1.1 | 1.1 | 1.1 | 4.0* |
| Cured @ 500° F. | 15.5 | 22.3 | 62.0 | 48.3 | * |

*Polyetherimides do not require a cure step to achieve ultimate properties. Polyetherimide plaques that were cured at 500° F. distorted and warped. The 60 mil thick plaques are also conditioned at 73° F. and 50% relative humidity for 24 hours before testing. The testing is done in a room controlled at 73° F. and 50% relative humidity.

EXAMPLE VIII

Comparative Example

Two polyamide-imide copolymer blends were prepared to demonstrate the importance of having a two-phase polymer system when solid state polymerization, at temperatures up to 500° F., is required to build the polyamide-imide properties. One blend contained 20 weight percent of an amorphous polyamide (Trogamid-T) while the other blend contained 20 weight percent of polyetherimide (Ultem 1000). Each alloy contained 80 weight percent of a polyamide-imide copolymer prepared as detailed in Example I. The alloys were melt compounded on a Werner and Pfleiderer twin screw extruder (ZSK-30) along with 3% TiO$_2$ and 0.5% poly(tetrafluoroethylene). Each sample was injection molded into bars and then cured on a seven day cycle with one day at 320° F., 400° F., 450° F., 475° F., plus three days at 500° F. Tensile properties, heat deflection temperature (HDT), and the glass transition temperatures of the blends were measured before and after cure.

The amorphous polyamide is miscible with the polyamide-imide copolymer, thus, the blend exhibits a single glass transition temperature. The as-molded $T_g$ of the polyamide-imide/amorphous polyamide blend was 410° F. and after curing on a seven day cycle the blend $T_g$ rose 40° F. to 450° F. The cured polyamide-imide/amorphous polyamide molded bars were extremely distorted and dark brown in color (degraded) and their tensile strengths and elongations were only 5,360 psi and 1.9%, respectively. The as-molded tensile strength and elongation of this 80/20 polyamide-imide/amorphous polyamide blend was 7,950 psi and 2.5%, respectively. The HDT of the cured blend was only 423° F. This reduction in physical properties shows that a 20% loading of the amorphous polyamide inhibited the excellent curing characteristics of the polyamide-imide copolymer, such that the final blend $T_g$ and HDT did not exceed 500° F. This low $T_g$ caused degradation of the molded bar when it was cured at 500° F. Furthermore, a reduction in toughness was observed, as illustrated by the tensile elongation property.

The polyetherimide is not miscible in the polyamide-imide copolymer as shown in Example IV. At a 20% polyetherimide loading, two $T_g$s were detected, each of which was close to the $T_g$ of the respective pure polymer component. The as-molded $T_g$s were 492° F. and 428° F., which correspond to the polyamide-imide and polyetherimide component $T_g$s, respectively. After curing on a seven day cycle, the polyamide-imide component $T_g$ increased 30° F. to 522° F. and the bars were undistorted. The tensile strength of the polyamide-imide/polyetherimide blend increased from 12,200 psi to 20,900 psi, while the tensile elongation increased from 4.1% to 25.7 % during cure. The HDT of this blend also increased from 439° F. to 515° F. This increase in physical properties illustrates that the polyetherimide did not inhibit the curing characteristics of the polyamide-imide.

TABLE 7

Polyamide-Imide/Polyetherimide Blends
Shrinkage, $T_g$, HDT vs. Cure Cycle

| *Cure °F. | *Shrink Mils | HDT °F. | *IV dl/g | *In- sol. % | Glass Trans. Temp., $T_g$ | | | |
|---|---|---|---|---|---|---|---|---|
| | | | | | PAI °C. | PEI °C. | PAI °F. | PEI °F. |
| Sample A, 0% PEI | | | | | | | | |
| 75 | 4.1 | 457 | 0.59 | 0 | 262 | ND | 503.6 | ND |
| 320 | 6.3 | 450 | 0.56 | 0 | 256 | ND | 494.6 | ND |
| 400 | 7.8 | 480 | 0.56 | 0 | 253 | ND | 487.4 | ND |
| 450 | 7.6 | 496 | 0.63 | 0 | 260 | ND | 500 | ND |
| 475 | 7.9 | 513 | 0.8 | 0 | 265 | ND | 509 | ND |
| 500 | 9.1 | | | 34.7 | | ND | | ND |
| 500 | 9.3 | | | 64.9 | | ND | | ND |
| 500 | 9.3 | 531 | 1.34 | 69.8 | 276 | ND | 528.8 | ND |
| Sample B, 10% PEI | | | | | | | | |
| 75 | 5.1 | 452 | 0.57 | 0 | 255 | ND | 491 | ND |
| 320 | 7.2 | 451 | 0.53 | 0 | 256 | ND | 492.8 | ND |
| 400 | 8.6 | 474 | 0.57 | 0 | 258 | 221 | 496.4 | 429.8 |
| 450 | 8.8 | 493 | 0.67 | 0 | 260 | ND | 500 | ND |
| 475 | 9.3 | 509 | 0.94 | 7.6 | 262 | ND | 503.6 | ND |
| 500 | 11.1 | | | 75.2 | | ND | | ND |
| 500 | 11.9 | | | 72.6 | | ND | | ND |
| 500 | 11.9 | 526 | 1.17 | 80.2 | 273 | ND | 523.4 | ND |

*Note: Cure, °F. refers to Cure Temp., 1 Day, at °F. Shrink, Mils refers to Total Shrink, Mils/in. IV, dl/g refers to Inherent Viscosity Insol., % refers to Insolubles, Weight %

Polyamide-Imide/Polyetherimide Blends
Shrinkage, $T_g$, Hot vs. Cure Cycle

| *Cure °F. | *Shrink Mils | HDT °F. | *IV dl/g | *In- sol. ° | Glass Trans. Temp., $T_g$ | | | |
|---|---|---|---|---|---|---|---|---|
| | | | | | PAI °C. | PEI °C. | PAI °F. | PEI °F. |
| Sample C, 20% PEI | | | | | | | | |
| 75 | 5.6 | 439 | 0.59 | 0 | 258 | 213 | 496.4 | 415.4 |
| 320 | 7.8 | 448 | 0.58 | 0 | 251 | 215 | 483.8 | 419 |
| 400 | 8.9 | 468 | 0.61 | 0 | 260 | 216 | 500 | 420.8 |
| 450 | 9.1 | 490 | 0.67 | 0 | 257 | 220 | 494.6 | 428 |
| 475 | 9.8 | 502 | 0.89 | 4.8 | 262 | 221 | 503.6 | 429.8 |
| 500 | 12.6 | | | 67.5 | | 218 | | 424.4 |
| 50 | 12.8 | | | 78.9 | | 224 | | 435.2 |
| 500 | 12.8 | 520 | 0.98 | 83.4 | 273 | 224 | 523.4 | 435.2 |
| Sample D, 30% PEI | | | | | | | | |
| 75 | 6.1 | 429 | 0.57 | 0 | 251 | 221 | 483.8 | 429.8 |
| 320 | 7.7 | 437 | 0.55 | 0 | 251 | 221 | 483.8 | 429.8 |
| 400 | 9.4 | 461 | 0.57 | 0 | 260 | 221 | 500 | 429.8 |
| 450 | 9.4 | 483 | 0.68 | 0 | 267 | 218 | 512.6 | 424.4 |
| 475 | 10.8 | 494 | 0.93 | 8 | 260 | 223 | 500 | 433.4 |
| 500 | 13.2 | | | 70.7 | | 220 | | 428 |
| 500 | 14.3 | | | 70.6 | | 221 | | 430 |

TABLE 7-continued

| 500 | 14.3 | 506 | 1.4 | 65.3 | 265 | 220 | 509 | 428 |

*Note: Cure, °F. refers to Cure Temp., 1 Day, at °F. Shrink, Mils refers to Total Shrink, Mils/in. IV, dl/g refers to Inherent Viscosity Insol., ° refers to Insolubles, Weight %

I claim:

1. An injection moldable composition having improved toughness when annealed at temperatures up to 500° F. comprising about 10 to about 30 percent by weight of a polyetherimide melt compounded with a polyamide-imide copolymer comprising A units of:

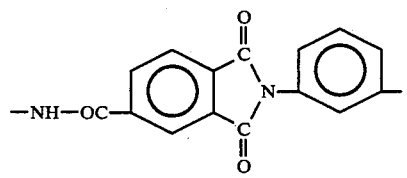

and B units of:

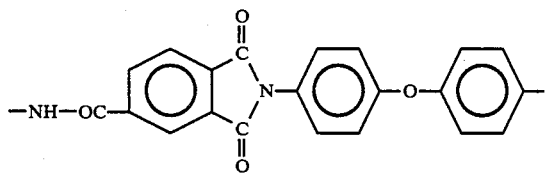

wherein the molar ratio of A units/B units is about 30/70.

2. The injection moldable composition of claim 1 wherein said polyetherimide has the following repeating unit:

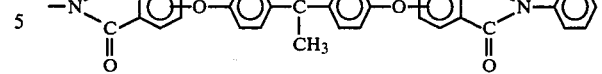

3. A process for improving the impact properties of an amide-imide copolymer, said process comprising melt compounding about 10 to about 30 weight percent of a polyetherimide with an amide-imide copolymer which comprises A units of:

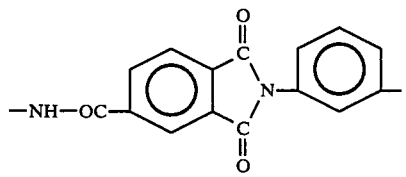

and B units of:

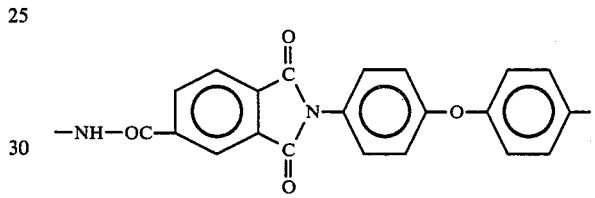

wherein the molar ratio of A units/B units is about 30/70.

4. The process of claim 3 wherein said polyetherimide has the following repeating unit:

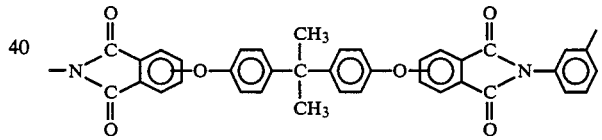

* * * * *

UNITED STATES PATENT OFFICE
CERTIFICATE OF CORRECTION

Patent No. 4,705,832     Dated November 10, 1987

Inventor(s) Gary T. Brooks

It is certified that error appears in the above-identified patent and that said Letters Patent are hereby corrected as shown below:

| Patent Column | Line | |
|---|---|---|
| 6 | 50 | reads "$C_y H_{2y1}$" and should read --$C_y H_{2y} - Y_{2y1}$-- |
| 6 | 51 | reads "and R" and should read --$R^1$-- |
| 13 | 8 | reads "hot circulating oven" and should read --hot air circulating oven-- |
| 14 | 55 | reads "(1.21 moles were" and should read --(1.21 moles) were-- |
| 18 | 51 | reads "Tg, Hot vs." and should read --Tg, HDT vs.-- |
| 18 | 61 | reads "50   12.8" and should read --500   12.8-- |

Signed and Sealed this

Twenty-eighth Day of February, 1989

Attest:

DONALD J. QUIGG

Attesting Officer     Commissioner of Patents and Trademarks